(12) United States Patent
Murata et al.

(10) Patent No.: US 7,721,180 B2
(45) Date of Patent: May 18, 2010

(54) INFORMATION MANAGEMENT SYSTEM, INFORMATION MANAGEMENT APPARATUS AND INFORMATION MANAGEMENT METHOD

(75) Inventors: Masakazu Murata, Kanagawa (JP); Ryo Abiko, Kanagawa (JP); Shingo Nakagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 1058 days.

(21) Appl. No.: 11/403,789

(22) Filed: Apr. 13, 2006

(65) Prior Publication Data

US 2006/0233527 A1  Oct. 19, 2006

(30) Foreign Application Priority Data

Apr. 15, 2005 (JP) ............................. P2005-119090

(51) Int. Cl.
    *H03M 13/00* (2006.01)
(52) U.S. Cl. .......................... 714/755; 714/786; 386/95
(58) Field of Classification Search ................. 714/755, 714/786, 769; 386/95; 711/202, 112
    See application file for complete search history.

(56) References Cited

U.S. PATENT DOCUMENTS 6,378,007 B1 * 4/2002 Southwell ....................... 710/1
6,636,942 B2 * 10/2003 Greco .......................... 711/112
2006/0177199 A1 * 8/2006 Horiguchi et al. ............. 386/95

FOREIGN PATENT DOCUMENTS

| JP | 2003 46977 | 2/2003 |
| JP | 2004 146874 | 5/2004 |
| JP | 2004 336593 | 11/2004 |

* cited by examiner

*Primary Examiner*—Guy J Lamarre
(74) *Attorney, Agent, or Firm*—Frommer Lawrence & Haug LLP; William S. Frommer; Paul A. Levy

(57) ABSTRACT

An information management system has an information management apparatus that receives a data stream with a general-purpose format, which is constituted of data and additional information, from a data-supplying system and separates the additional information from the data stream to hold and manage the data obtained by separating the additional information from the data stream. The information management system has a data storage device that stores the data obtained by separating the additional information from the data stream with the information management apparatus. The data is stored in the data storage device as it is with the data having the general-purpose format.

18 Claims, 11 Drawing Sheets

INFORMATION MANAGEMENT SYSTEM, INFORMATION MANAGEMENT APPARATUS AND INFORMATION MANAGEMENT METHOD

CROSS REFERENCE TO RELATED APPLICATION

The present invention contains subject matter related to Japanese Patent Application No. JP 2005-119090 filed in the Japanese Patent Office on Apr. 15, 2005, the entire contents of which being incorporated herein by reference.

BACKGROUND OF THE INVENTION

1. Field of the Invention

The present invention relates to an information management system, an information management apparatus and an information management method. More particularly, it relates to an AV sever system that stores and reproduces audio/video data streams in/from data storage device.

2. Description of Related Art

Recently, the AV server system of GCD system has been often used in a broadcast station, an audio/video information distribution system or the like when editing any audio/video information. The AV server system has data recording/reproducing apparatus, data storage device and the like. The data recording/reproducing apparatus encodes and compresses (or performs encoding on) any audio/video information according to any data compression standard such as MPEG when recording the data. Header information such as frame index is added to the coded and compressed audio/video data, thereby producing a data stream with a predetermined data format. The data storage device stores the data stream. In such the AV server with its individual data format.

The data recording/reproducing apparatus reads the data stream from the data storage device when reproducing data, to decode and decompress (or performs decoding on) the data stream. Any decoded and decompressed audio/video data is used as audio/video information. The data recording/reproducing apparatus transmits such the audio/video information to an image display device and/or an audio output device. In such the AV server system, the data stream is managed under any file managements.

Such the AV server system has information-processing apparatus and method, a program recording medium, and a program used therefore (see Japanese Patent Application Publication No. 2004-336593). The information-processing apparatus has a body-producing unit, a header-producing unit, and a file-producing unit used when it produces any files with a format constituted of a header, a body, and a footer. The body-producing unit produces body information based on input data and the header-producing unit acquires a size of the input data and produces table information to produce header information based on the table information. After producing the body, the file-producing unit combines these pieces of the header information, the body information, and footer information with each other. If an information management apparatus is configured as the above one, any broadcast equipment can perform any file-swapping with a personal computer.

SUMMARY OF THE INVENTION

Regarding a file management method in such the AV server system of GCD system, it is necessary that real time record and/or reproduction are established. If the information-processing apparatus disclosed in the above publication manages the data storage device, the information-processing apparatus has often recorded and/or reproduced AV data with its most preferably individual data format. In this case, however, when the AV server system of GCD system receives any request to record AV data with a general-purpose format or the like, which is used in a network, thereon, it is necessary to convert a data format of AV data file received from the network into an inner individual format of the AV server system because the data format of the AV server system is different from that in the network.

If the AV server system transmits an AV data file to the network, it is also necessary for the AV server system to convert its individual data format of the AV data file into a general-purpose format thereof. Thus, such the AV server system may perform many various kinds of processing at input and output from and into the network, thereby limiting any performance of the network.

If the data storage device records any header information such as frame index together with the AV data, it is necessary to read both of the header information and the AV data therefrom when reproducing the data, thereby generating many seek operations in the data storage device to degrade its performance.

It is desirable to provide an information management system, an information management apparatus and an information management method that are possible to store data with a general-purpose format in the data storage device as it is and to improve input/output performance of data stream from any data-supplying system with any real time record and/or reproduction being maintained in an information recording/reproducing system.

According to an embodiment of the invention, there is provided an information management system. The information management system has an information management apparatus that receives a data stream with a general-purpose format, which is constituted of data and additional information from a data-supplying system, and separates the additional information from the data stream to hold and manage the data obtained by separating the additional information from the data stream. The information management system also has a data storage device that stores the data obtained by separating the additional information from the data stream with the information management apparatus.

In this embodiment of the information management system, when recording the data, the information management apparatus receives a data stream with a general-purpose format, which is constituted of data and additional information, from a data-supplying system and separates the additional information from the data stream to hold and manage the data obtained by separating the additional information from the data stream. The data storage device stores the data obtained by separating the additional information from the data stream with the information management apparatus.

Thus, the data can be stored in the data storage device as it is with the data having a general-purpose format. This allows input/output performance of data stream (file) from any data-supplying system to be improved with any real time record and/or reproduction being maintained in an information recording/reproducing apparatus. Further, this allows real time record and/or reproduction operations to be perfectly established in a data storage device.

According to another embodiment of the invention, there is provided an information management system. This information management system has an information recording/reproducing apparatus that receives data with non-general purpose format from a data-supplying system and encodes the data. The information management system also has an information management apparatus that holds and manages additional information which is added to the data encoded by the information recording/reproducing apparatus. The information management system further has a data storage device that stores the data encoded by the information recording/reproducing apparatus.

In this embodiment of the information management system, when recording the data, the information management apparatus receives data with a non-general purpose format from a data-supplying system and encodes the data so that it can be converted to any data with a general-purpose format. The information management apparatus holds and manages additional information which is added to the data encoded by the information recording/reproducing apparatus. The data storage device stores the data encoded by the information recording/reproducing apparatus.

Thus, the data with a general-purpose format converted from the data with a non-general purpose format can be stored in the data storage device as it is. This allows input/output performance of the data with a non-general purpose format from any data-supplying system to be improved with any real time record and/or reproduction being maintained in an information recording/reproducing apparatus. Further, this allows real time record and/or reproduction operations to be perfectly established in a data storage device.

According to further embodiment of the invention, there is provided an information management apparatus that manages a data stream with a general-purpose format, which is constituted of data and additional information. When recording the data, the information management apparatus receives the data stream from a data-supplying system, separates the additional information from the data stream, and stores the data obtained by separating the additional information from the data stream on data storage device.

In the embodiment of the information management apparatus, when managing the data stream with a general-purpose format, which is constituted of the data and the additional information, and recording the data, the information management apparatus receives the data stream from a data-supplying system, separates the additional information from the data stream, and stores the data obtained by separating the additional information from the data stream on the data storage device.

Thus, the data can be stored in the data storage device as it is with the data having a general-purpose format. This allows input/output performance of data stream (file) from any data-supplying system to be improved with any real time record and/or reproduction being maintained in an information recording/reproducing system. Further, this allows real time record and/or reproduction operations to be perfectly established in a data storage device.

According to further embodiment of the invention, there is provided an information management apparatus that is connected with an information recording/reproducing system, which receives data with a non-general purpose format from a data-supplying system and encodes the data. When recording the data, the information management apparatus holds and manages additional information that is added to the data encoded by the information recording/reproducing system, and stores the encoded data on data storage device.

In the embodiment of the information management apparatus, when managing the information recording/reproducing system which receives data with a non-general purpose format from a data-supplying system and encodes the data and recording the data, the information management apparatus holds and manages additional information that is added to the data encoded by the information recording/reproducing system, and stores the encoded data on the data storage device.

Thus, the data with a general-purpose format converted from the data with a non-general purpose format can be stored in the data storage device as it is. This allows input/output performance of the data with a non-general purpose format from any data-supplying system to be improved with any real time record and/or reproduction being maintained in an information recording/reproducing system. Further, this allows real time record and/or reproduction operations to be perfectly established in a data storage device.

According to additional embodiment of the invention, there is provided an information management method. When recording data, the method has the steps of receiving the data stream with a general-purpose format, which is constituted of data and additional information, from a data-supplying system, separating the additional information from the data stream received from the data-supplying system, storing the data obtained by separating the additional information from the data stream on a first memory area, and storing the additional information that is separated from the data stream on a second memory area.

In the embodiment of the information management method, when managing the data stream with a general-purpose format, which is constituted of data and additional information, and recording the data, the data can be stored in the second memory area as it is with the data having a general-purpose format. This allows input/output performance of data stream (file) from any data-supplying system to be improved with any real time record and/or reproduction being maintained in an information recording/reproducing system. Further, this allows real time record and/or reproduction operations to be perfectly established in the second memory area.

According to still further embodiment of the invention, there is provided an information management method. When recording data, the information management method has the steps of receiving data with non-general purpose format from a data-supplying system, encoding the data received from the data-supplying system and producing additional information that is added to the encoded data, storing the additional information in a second memory area, and storing the encoded data in a first memory area.

In the embodiment of the information management method, when managing the information recording/reproducing system which receives data with a non-general purpose format from a data-supplying system and encodes the data and recording the data, the data with a general-purpose format converted from the data with a non-general purpose format can be stored in the second memory area as it is. This allows input/output performance of the data with a non-general purpose format from any data-supplying system to be improved with any real time record and/or reproduction being maintained in an information recording/reproducing system. Further, this allows real time record and/or reproduction operations to be perfectly established in the second memory area.

The concluding portion of this specification particularly points out and directly claims the subject matter of the present invention. However that skill in the art will best understand both the organization and method of operation of the invention, together with further advantages and objects thereof, by reading the remaining portions of the specification in view of the accompanying drawing(s) wherein like reference characters refer to like elements.

DESCRIPTION OF THE INVENTION

Figure 1:
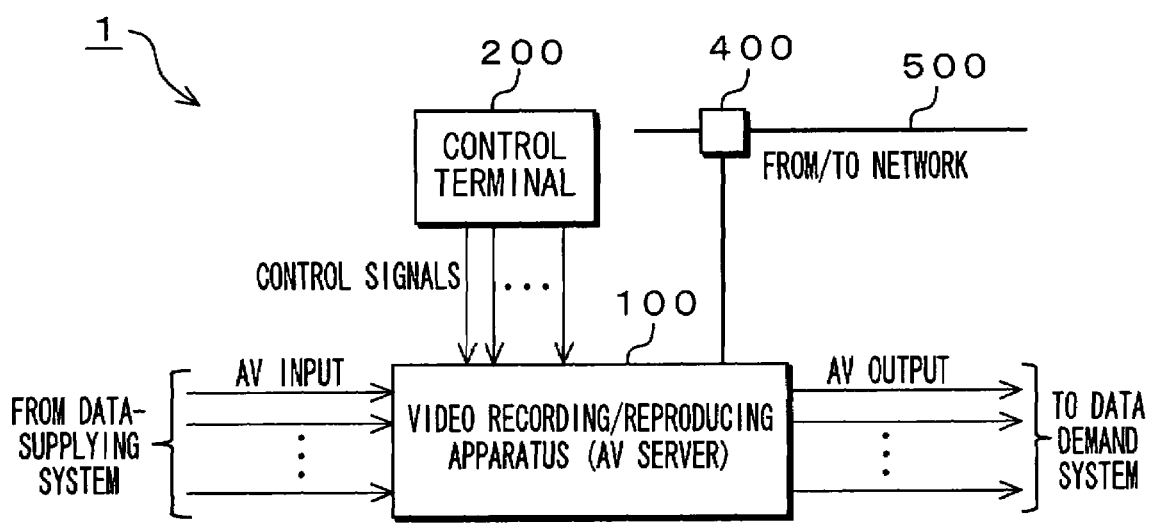
FIG. 1 is a block diagram for showing a configuration of an embodiment of AV server system according to the invention.

Referring now to the drawings, preferred embodiments of an information management system, an information management apparatus, and an information management method according to the invention will be described specifically below.

FIG. 1 shows a configuration of an embodiment of an AV server system 1 according to the invention.

The AV server system 1 shown in FIG. 1 is an example of an information management system. In a broadcast station or an information distribution center on video and audio (including sound and music), the AV server system 1 writes and records an audio and/or video (AV) data stream in any data storage device and/or reads the AV data stream out of the data storage device and reproduces the AV data stream.

The AV server system 1 has a video recording/reproducing apparatus (hereinafter, referred to as "AV server 100") and a control terminal 200. When recording the data, the AV server 100 receives pieces of information on video and audio materials (AV input) and encodes them as the data under the recording control of the control terminal 200. The AV server 100 then adds any additional information to the encoded data to produce a data stream with a predetermined data format. The AV server 100 records and stores this data stream.

When reproducing the data, the AV server 100 reads the data stream with a predetermined data format, which has been recorded and stored, under the reproducing control of the control terminal 200. The AV server 100 decodes the read data stream with a predetermined data format. After decoding, the AV server 100 outputs the decoded data (AV output). The AV server 100 is connected with a network 500 through a HUB 400. The AV server 100 receives or transmits the data stream with a predetermined data format from or to the network 500. This is because a priority of an access from the network 500 is established so that the AV server 100 can record and manage file format data such as MXF file format data and AVI format data as it is if it is at all possible.

Figure 2:
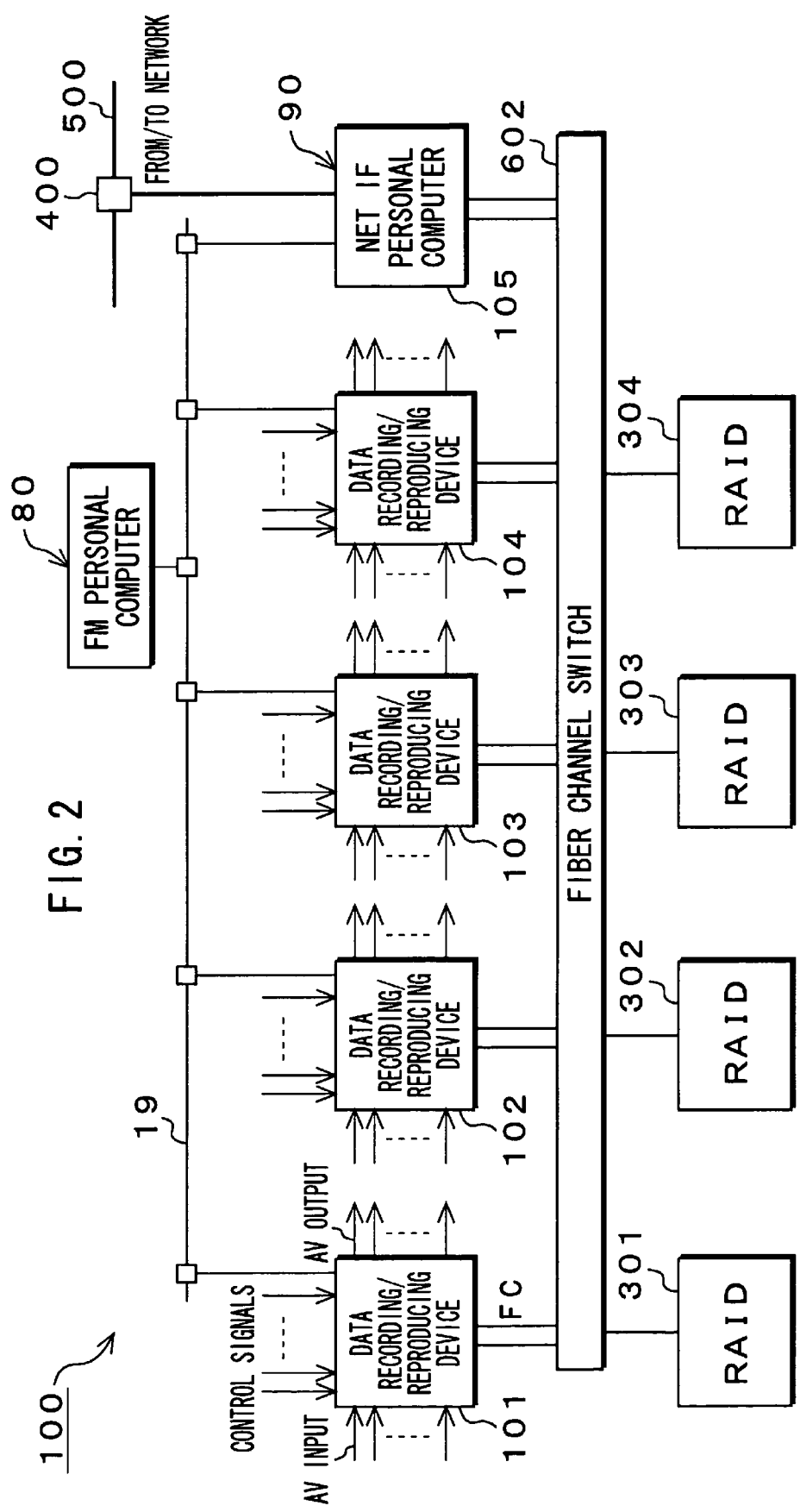
FIG. 2 is a diagram for showing an internal configuration of an embodiment of the AV server according to the invention.

FIG. 2 shows an internal configuration of an embodiment of the AV server 100. The AV server 100 shown in FIG. 2 is an example of an information management apparatus. The AV server 100 has a personal computer (hereinafter referred to as "FM personal computer 80") for file system (as a file manager), a personal computer (hereinafter referred to as "Net IF personal computer 90") for network interface, four data recording/reproducing devices 101-104, four data storage devices (hereinafter referred to as "RAID") 301-304, and a fiber channel switch 602.

The FM personal computer 80 is a portion of the information management apparatus and is connected to the Net IF personal computer 90 and the four data recording/reproducing devices 101-104 through a local area network (LAN) 19 such as ETHERNET (trade mark). The FM personal computer 80 manages any additional information (file information) of the AV data stream to be managed in the AV server 100. The FM personal computer 80 holds any information to be positioned in any file header portion and file footer portion, which are added to the AV data, via the data recording/reproducing device 101 or the like.

The Net IF personal computer 90 is connected with the network 500. The Net IF personal computer 90 receives any data stream (Din) with a general-purpose format from a data-supplying system and separates any additional information from the received data stream Din to hold and manage AV data obtained by separating the additional information from the data stream Din. The data stream with a general-purpose format is constituted of AV data including audio data and video data and any additional information. The additional information includes a file header portion and a file footer portion. For example, the Net IF personal computer 90 performs any addition or any deletion of the file header portion and the file footer portion based on any information from the FM personal computer 80 when the Net IF personal computer 90 receives or transmits the data via the network. The addition or deletion is performs so that the AV server 100 can record or manage the data stream with a general-purpose from the network 500 exactly and smoothly.

Each of the data recording/reproducing devices 101-104 is connected with the fiber channel switch 602 through an optical communication line (fiber channel (FC)) to implement any high-speed write/read operations of data. The fiber channel switch 602 is connected with the four RAIDs 301-304. As the RAIDs 301-304, recording medium or the like such as a magnetic disk or a magneto optical disk is used.

When recording the data, the data recording/reproducing device 101 receives any information on video and audio materials (SDI data as AV input) and encodes and compresses (performs encoding on) the SDI data according to a predetermined compression standard (MPEG or the like) under the recording control of the control terminal 200. The SDI data relates to any information on video and audio materials that is produced or edited according to NTSC scheme or PAL scheme in data-supplying system 600 such as a broadcast station or an information distribution center on video and audio. The data recording/reproducing device 101 adds any additional information to the AV data that is obtained by compressing the SDI data to produce an AV data stream with a predetermined format. The AV data stream is recorded in any of the RAIDs 301-304 through the fiber channel switch 602.

When reproducing the data, the data recording/reproducing device 101 reads the AV data stream with a predetermined data format based on the additional information from any of the RAIDs 301-304 under the reproducing control of the control terminal 200. The data recording/reproducing device 101 decodes and uncompresses (performs decoding on) the AV data stream with a predetermined data format, which is read out of, for example, the RAID 301. The data recording/reproducing device 101 then outputs the SDI data obtained by decoding and uncompressing the AV data stream as the AV output to, for example, an image display device or an audio output device.

Figure 3:
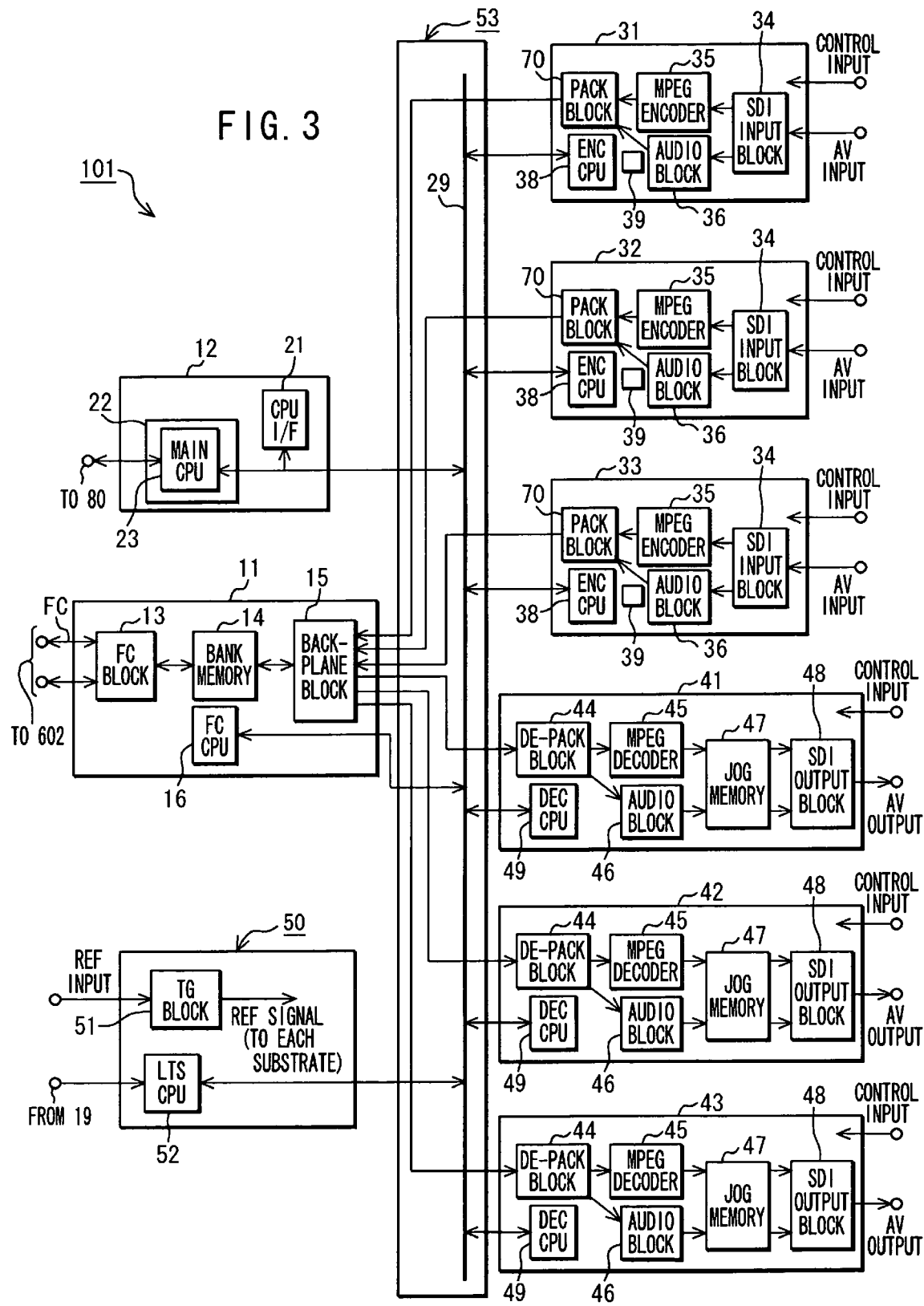
FIG. 3 is a diagram for showing an internal configuration of an embodiment of data recording/reproducing device according to the invention.

FIG. 3 shows an internal configuration of an embodiment of the data recording/reproducing device 101 according to the invention.

The data recording/reproducing device 101 shown in FIG. 3 has one substrate for inputting/outputting data to/from the fiber channel (hereinafter referred to as "FC input/output substrate 11"), three encoder substrates (hereinafter referred to as "ENC substrates 31-33"), three decoder substrates (hereinafter referred to as "DEC substrates 41-43"), and one record/reproduction control substrate 12.

The record/reproduction control substrate 12 has a CPU interface (hereinafter referred to as "CPU I/F circuit 21") and a CPU block 22. The CPU block 22 has a main CPU 23. The main CPU 23 controls circuits and/or memories mounted on the FC input/output substrate 11. For example, the CPU 23 acquires any information on a writing area in the RAID 301 from the FM personal computer 80 and allows the RAID 301 to record the AV data stream Std when data of the AV data stream Std occupies a previously reserved address area in a bank memory 14 mounted on the FC input/output substrate 11. An I/O port, which is not shown, of the record/reproduction control substrate 12 is connected with an AV serial backplane 53. To the AV serial backplane 53, the FC input/output substrate 11 is connected.

The FC input/output substrate 11 is configured as a recording/reproducing portion. The FC input/output substrate 11 has a fiber channel interface circuit (hereinafter referred to as "FC block 13"), a bank memory 14, an encoder/decoder interface circuit (hereinafter referred to as "backplane block 15"), and an FC sub CPU 16 (shown as FC CPU in the drawing). The FC block 13 is constituted of field programmable gate array (FPGA) and has an optical signal processing function. For example, the FC block 13 is connected with the fiber channel switch 602. The FC block 13 also has an optical-signal-processing portion, which is not shown, for performing any optical signal processing such as optical modulation based on the data stream. The FC block 13 is connected to the bank memory 14 that stores the AV data stream Std in units of frame. For example, the AV data stream Std is written to an indicated address area in the bank memory 14. Information on the address area is added (placed) on the AV data stream Std one upon another.

The AV data stream Std is transferred to the address area indicated by the information. This allows the bank memory 14 to perform buffering of the AV data stream Std. As the bank memory 14, a hard disk or the like is used. The bank memory 14 is connected with the backplane block 15. The backplane block 15 is connected with the AV serial backplane 53 that receives and transmits the AV data stream Std from and to an I/O port of each of the ENC substrates 31-33 and the DEC substrates 41-43.

The FC sub CPU 16, which is constituted of FPGA and is local and auxiliary CPU (Nios) against the main CPU 23, is built in the FC input/output substrate 11. The FC sub CPU 16 arbitrates destinations to which the AV data streams Std that are received from the plural ENC substrates 31-33 are transferred when recording the data. The FC sub CPU 16 also controls the FC block 13 to read and write the AV data stream from and to the bank memory 14 based on any control commands from the main CPU 23 and performs access control to RAID 301 or the like via the fiber channel switch 602. For example, the FC sub CPU 16 receives from the main CPU 23 the information on an area where the AV data stream Std is to be written in RAID 301 and controls the FC block 13 to write the AV data stream stored on the bank memory 14 to RAID 301 based on this information.

To the AV serial backplane 53, the ENC substrates 31-33 and the DEC substrates 41-43 are connected. The ENC substrate 31 has an SDI input block 34, an MPEG encoder 35, an audio block 36, a pack block 70, an ENC sub CPU 38 (shown as ENC CPU in the drawing), and a mini bank memory 39.

The ENC substrate 31 receives an audio/video signal SDI of NTSC scheme or PAL scheme when recording the data and encodes and compresses (performs encoding on) the received signal SDI based on any signal compression standard such as MPEG. The ENC substrate 31 adds any additional information to audio/video data that is obtained by compressing the signal SDI to produce an AV data stream Std. The ENC substrate 31 transmits the AV data stream Std to the FC input/output substrate 11 at any time under the control of the main CPU 23 for every time when the AV data stream Std of one frame is stored in the bank memory 14. This is carried out when the ENC substrate 31 receives any control signals from the control terminal 200. The ENC substrate 31 and the like are connected to the control terminal 200 through a communication cable using any communication protocol such as RS-422A.

In this embodiment, relative to instruction which position in the bank memory 14 the AV data stream is to be transferred to, information thereon is placed on the AV data stream one upon another. This enables the AV data stream Std to be written in an instructed address area in the bank memory 14. Similarly, other ENC substrates 32 and 33 receive audio/video signal SDI and transfer the AV data stream Std. These other ENC substrates 32 and 33 have the same configuration and function as those of the ENC substrate 31, a detailed explanation of which will be omitted.

The DEC substrate 41 has a de-pack block 44, an MPEG decoder 45, an audio block 46, a jog memory 47, an SDI output block 48, and an DEC sub CPU 49 (shown as DEC CPU in the drawing).

When reproducing the data, the DEC substrate 41 receives the AV data stream Std from the bank memory 14 by the de-pack block 44. The de-pack block 44 separates any additional information from the AV data stream Std to produce MPEG data stream. The de-pack block 44 transmits the MPEG data stream from which the additional information is separated to the MPEG decoder 45 and the audio block 46, respectively. The MPEG decoder 45 decodes and decompresses (performs decoding on) the MPEG data stream based on a predetermined MPEG standard to output the video data. The audio block 46 performs decoding on the MPEG data stream to output the audio data.

The jog memory 47 stores audio and video data thus de-packed and decoded. The audio and video data thus decoded becomes SDI data. The jog memory 47 transmits such the SDI data to, for example, an image display device or an audio output device through the SDI output block 48.

It is to be noted that the DEC substrate 41 receives any control signals from the control terminal 200. The DEC substrate 41 and the like are connected to the control terminal 200 through a communication cable using any communication protocol such as RS-422A. Similarly, other DEC substrates 42 and 43 receive the AV data stream Std and transmit the SDI data. These other DEC substrates 42 and 43 have the same configuration and function as those of the DEC substrate 41, a detailed explanation of which will be omitted.

In the above AV serial backplane 53, a CPU bus 29 is provided. To the CPU bus 29, the FC sub CPU 16, the main CPU 23, the ENC sub CPU 38 on each of the ENC substrates 31-33, the DEC sub CPU 49 on each of the DEC substrates 41-43, and an REF input substrate 50 are connected. The REF input substrate 50 has a TG block 51 and an LTS sub CPU 52 (shown as LTS CPU in the drawing). The TG block 51 receives an REF signal (frame synchronizing signal) and supplies the REF signal to each of the substrates 11, 12, 31-33, 41-43, and the like under the control of the LTS sub CPU 52. The LTS sub CPU 52 is connected to the FM personal computer 80 and the Net IF personal computer 90 via ETHERNET (trade mark) 19 and to the CPU bus 29 to communicate with the FM personal computer 80, the Net IF personal computer 90, the main CPU 23 and the like. In this embodiment, other data recording/reproducing devices 102-104 have the same configuration as that of the data recording/reproducing device 101, a detailed explanation of which will be omitted.

Figure 4:
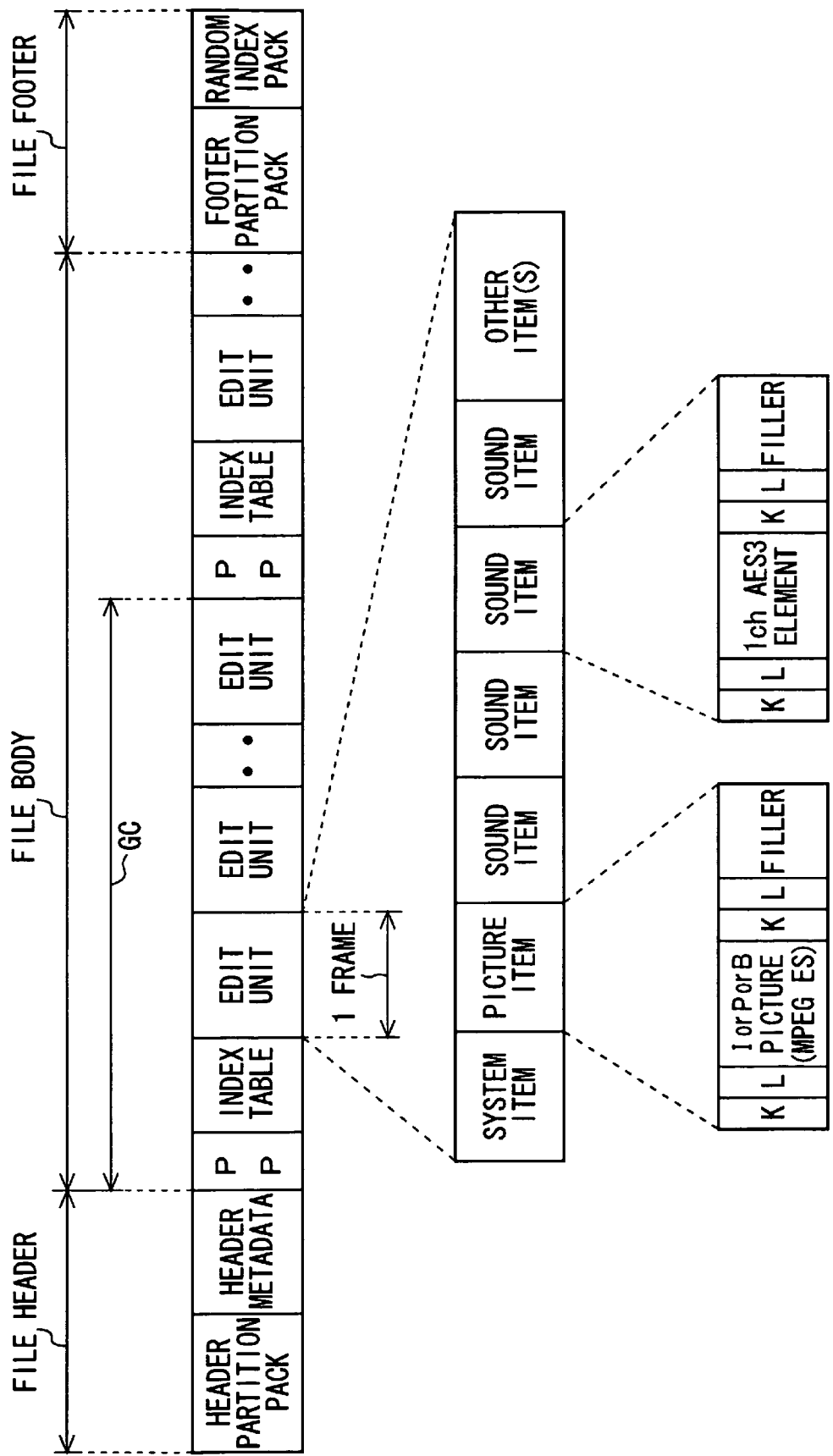
FIG. 4 is a diagram for showing an example of data structure in MXF file.

FIG. 4 shows a format example of a data structure in MXF file.

The data structure in MXF file shown in FIG. 4 is preferably applied to an AV multiple data format, which is used in an embodiment of the AV server system 1 according to the invention. In the data structure in MXF file, the AV data stream Std is constituted of a file header portion, a file body portion, and a file footer portion, which have a hierarchy structure.

The file body portion includes video data and audio data that are multiplex as the AV data, for example, in units of 60 frames (in a case of NTSC). This MXF file corresponds to any various recording formats without depending on a platform and corresponds to Quick Time (QT) (trade mark) that is scalable software.

The file header portion includes any necessary information for reproducing and/or editing the video data and audio data arranged in the file body portion according to the MXF standard using QT. In the file header portion, Run In, Header Partition Pack, and Header Metadata are arranged in turn as MXF header from a top thereof to an end thereof.

The Run In is an option for interpreting a start of the MXF header if a pattern by 11 bytes is met. The Run In can be saved up to 64 kilo bytes at a maximum but to 8 bytes in this embodiment. As Run In, any pattern other than the pattern by 11 bytes can be used in the MXF header.

The Header Partition Pack includes the pattern by 11 bytes that is used for identifying the file header portion, information indicating a form of data that is arranged in the file body portion and a file format thereof and the like. The Header Metadata includes information that is necessary for reading the AV data arranged in the file body portion.

The file body portion is constituted of a generic container (GC) or an essence container (EC). The generic container includes a Partition Pack (PP), an Index Table, and Edit Units. The Edit Units are arranged in unites of frame from a first frame to tenth frame.

The file footer portion includes a footer partition pack and a random index pack.

The Edit Unit of one frame includes the AV data that is multiplex, for example, in units of 60 frames (in a case of NTSC). The Edit Unit of one frame includes a System Item, a Picture Item, a Sound Item, and Other Item(s) (Auxiliary).

The System Item describes a local time code (LTC), UMID, and Essence Mark. The Sound Item includes, for example, four blocks. The Picture Item includes a key (K) and a data length (L) as well as I, P or B picture (MPEG ES) as a lower hierarch thereof, followed by K, L, and Filler. The Sound Item includes K and L as well as 1ch AES3 Element as a lower hierarch thereof, followed by K, L, and Filler.

The file footer portion includes Footer Partition Pack. The Footer Partition Pack includes data for identifying the file footer portion.

If giving the MXF file thus configured, the AV server 100 based on the MXF standard first reads the pattern by 11 bytes in the Header Partition Pack to discover the MXF header. The AV server 100 can read the AV data included in the GC based on the Header Metadata in the MXF header.

The following describes embodiments of the information management method according to the invention using operation examples of the AV server system 1 under various kinds of operation modes. According to the embodiments, a data portion of AV data stream with a general-purpose file format is efficiently separated from the data stream and stored in RAID 301 or the like, so that any performance can be considerably improved in the network by performing only minimum processing when inputting/outputting the data to/from the network.

[Network Input Mode]

Figure 5:
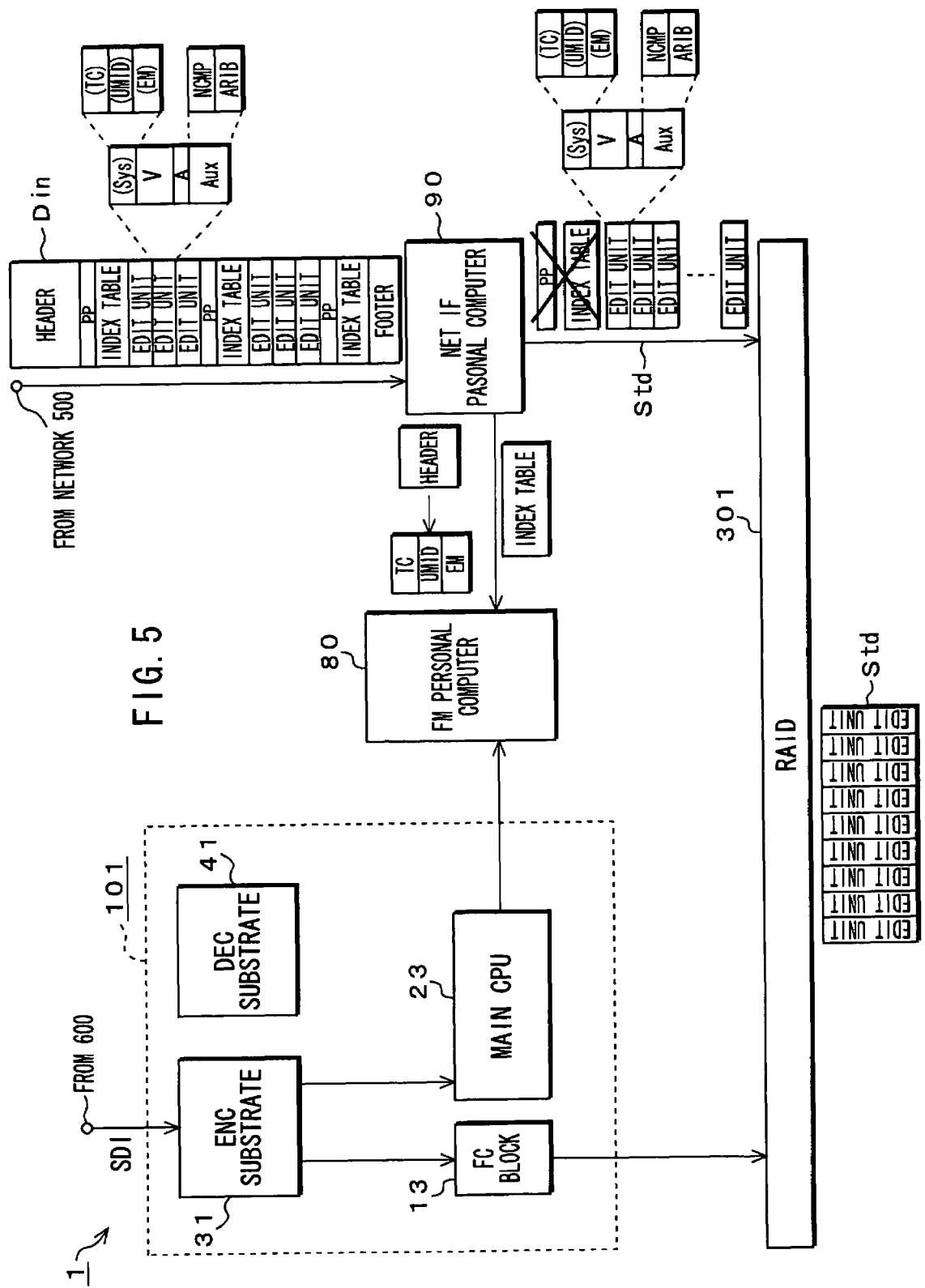
FIG. 5 is a schematic diagram for showing an operation example of a first embodiment of the AV server system in a network input mode.

FIG. 5 shows an operation example of a first embodiment of the AV server system 1 in a network input mode.

In this embodiment, it is assumed that the AV server system 1 performs the network input mode. The network input mode relates to a way to receive a data stream Din including AV data with a predetermined data format from the network 500, and store the AV data stream Std from which any header information (additional information) is separated in RAID 301 or the like of the AV server system 1. In other words, in this mode, RAID 301 or the like stores only the AV data stream Std (Edit Units) according to any file format.

The AV server system 1 shown in FIG. 5 is constituted of the FM personal computer 80, the Net IF personal computer 90, the data recording/reproducing device 101, and the RAID 301, which are shown in FIG. 2.

In the network input mode, the Net IF personal computer 90 receives the data stream Din with a general-format, which is constituted of data and additional information, from the network, separates the additional information (header information) from the data stream Din, and controls the FM personal computer 80 to hold and manage the additional information (header information). In the Net IF personal computer 90, a position in the RAID 301 that the AV data stream Std is to be stored and a recording format therefor can be optimized based on any species of data in each of the standard file formats (MXF, AVI and the like).

The header information includes the MXF header in which Run In, Header Partition Pack, and Header Metadata are illustratively arranged in turn from a top thereof to an end thereof, as shown in FIG. 4.

When receiving the MXF file, the Net IF personal computer 90 extracts a header portion thereof and informs the FM personal computer 80 of any data that is necessary for managing files in the FM personal computer 80. For example, the Net IF personal computer 90 acquires frame information such as numbers of channels or bits from Generic Sound Essence Descriptor in the Header Metadata or Delta Entry Array in the Index Table and transmits the frame information to the FM personal computer 80. The FM personal computer 80 writes the frame information such as numbers of channels or bits in its file entry. Thus, the FM personal computer 80 files and stores the frame information.

The Net IF personal computer 90 next extracts the partition pack (PP) and Index Table therefrom with referring to the data of the file body. The Net IF personal computer 90 then writes only the Edit Units remained in the file body in RAID 301 through the fiber channel switch 602 when a set amount of data occupies the memory. At the same time, the Net IF personal computer 90 generates any frame index information of written block unit from the extracted MXF Index Table and informs the FM personal computer 80 thereof.

The Net IF personal computer 90 transmits an AV data stream Std (together with numbers of channels or bits) obtained by separating the header information from the stream data Din to RAID 301 as it is without taking part in any contents of the Edit Unit. This is because the Net IF personal computer 90 is set to store received data as it is without taking part in any data in the received Edit Unit, as a rule. Thus, RAID 301 stores the AV data stream Std (a group of Edit Units) obtained by separating the header information (including the index information) from the data stream Din with the Net IF personal computer 90. As a result of operations, RAID 301 stores only Edit Units.

Thus, the AV data stream Std and any header information (including frame (index) information) are separately received by the RAID 301 and the FM personal computer 80, respectively, in synchronized record/reproduction of data. In this embodiment, in record/reproduction of data from/to the network, the Net IF personal computer 90 accesses RAID 90 with the AV data stream Std keeping its format as it is, thereby allowing any deterioration of performance due to a data format conversion to be restricted.

Since the Net IF personal computer 90 gives and receives any frame index to and from the FM personal computer 80 to maintain real time in the synchronized record or reproduction of data, it is possible to exhibit any performance in RAID 301 at a maximum. By performing such the network input mode, RAID 301 can store the AV data stream Std with a general-purpose format as it is, thereby improving any performance for inputting/outputting a file to/from the network 500 considerably together with maintenance of real time in the synchronized record or reproduction of data. Further, since the FM personal computer 80 stores any frame (index) information, it is possible to establish a real time record or reproduction operation in RAID 301 perfectly.

[Network Output Mode]

Figure 6:
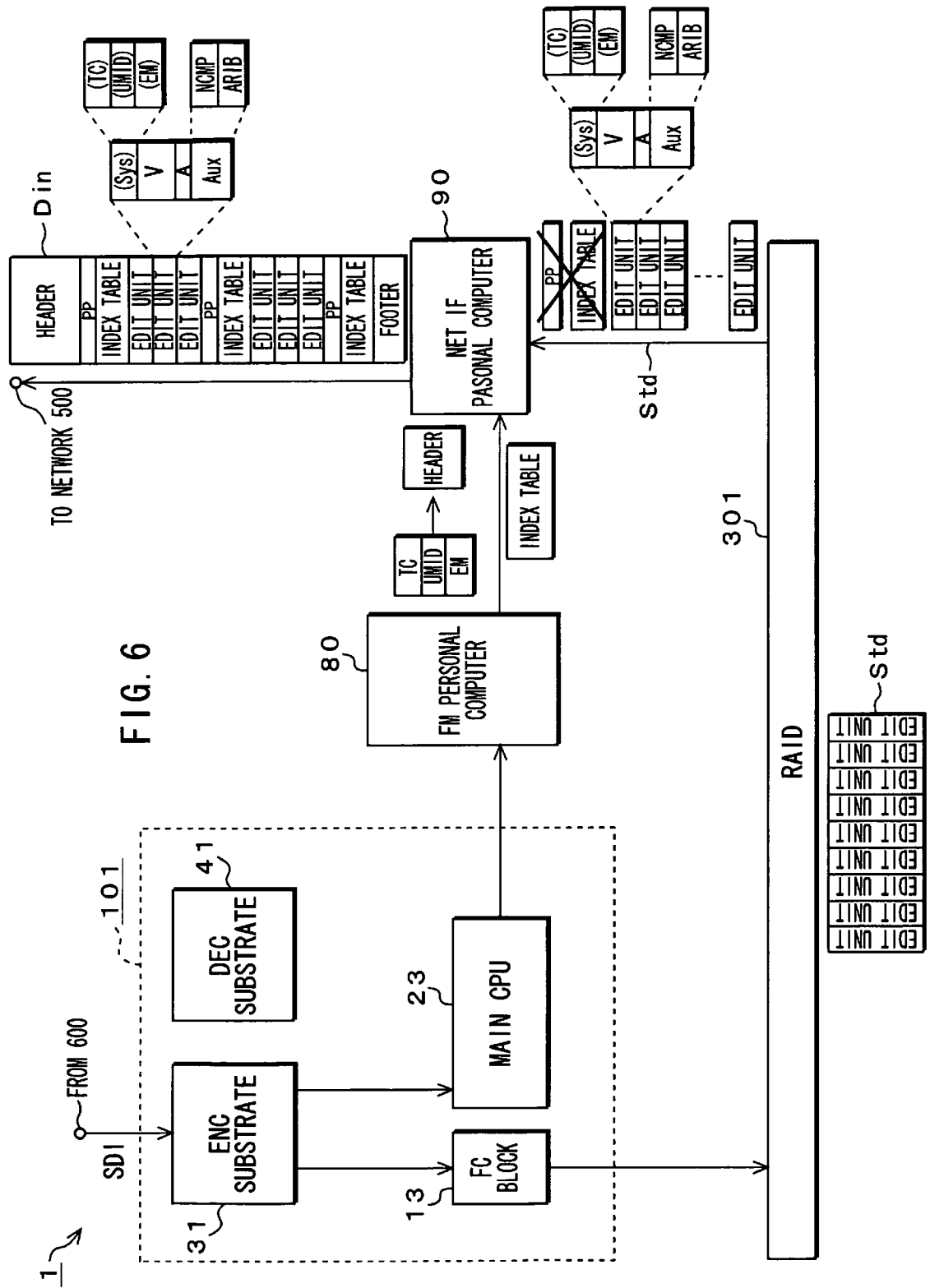
FIG. 6 is a schematic diagram for showing an operation example of the first embodiment of the AV server system in a network output mode.

FIG. 6 shows an operation example of the first embodiment of the AV server system 1 in a network output mode.

In this embodiment, it is assumed that the AV server system 1 performs the network output mode. The network output mode relates to a way to read the AV data stream Std obtained by separating any header information including frame (index) information from a data stream Din out of RAID 301 of the AV server system 1, add the header information thereto to produce a data stream Dout with a predetermined data format, and output it to the network 500.

Referring to FIG. 6, in the network output mode, the Net IF personal computer 90 receives the header information, reads the AV data stream Std corresponding to the received header information out of the RAID 301, combines the header information and the AV data stream Std to produce a data stream Dout with a general-format. In this case, the Net IF personal computer 90 adds a Header portion, an Index Table, a Partition Pack (PP) thereto based on any additional information from the FM personal computer 80 when transmitting the data stream to the network 500.

For example, the Net IF personal computer 90 opens the file for a file transfer protocol (FTP) and acquires any information that is necessary for producing an MXF header of this file to produce the MXF header. The Net IF personal computer 90 reads a set amount of data in the AV data stream Std out of RAID 301 through the fiber channel switch 602. At the same time, the Net IF personal computer 90 acquires a frame index corresponding to this AV data stream Std from the FM personal computer 80. The Net IF personal computer 90 produces the index table from the acquired AV data stream Std.

The Net IF personal computer 90 then transmits the AV data stream Std with the partition pack (PP) and the Index Table being suitably inserted between items of data in Edit Units read out of RAID 301 after transmitting the MXF header. The Net IF personal computer 90 finally transmits an MXF footer and finishes the transmission processing.

In the network output mode, the Net IF personal computer 90 transmits the stored AV data stream Std as it is without taking part in the AV data stream Std in the Edit Unit on RAID 301, as a rule. The AV data stream Std is manipulated only by the Header portion, the Partition Pack, the Index Table, the Footer, and the like. This allows the AV data stream with a general-purpose format to be transmitted to a network connector through the network 500.

Thus, the Net IF personal computer 90 is applied to the AV server system 1 as the first embodiment. When recording the data, the Net IF personal computer 90 receives the data stream Din with a general-purpose format, which is constituted of any header information and the AV data stream Std and separates the header information (including frame (index) information) from the data stream Din to hold and manage the AV data stream Std. RAID 301 then stores the AV data stream Std obtained by separating the header information from the data stream Din with the Net IF personal computer 90.

When reproducing the data, the Net IF personal computer 90 receives the header information from the FM personal computer 80, reads the AV data stream Std corresponding to the received header information out of RAID 301, combines the header information and the AV data stream Std to produce the data stream Dout with a general-purpose format, and transmits the data stream Dout to a network connector.

Thus, when recording the data, the AV data stream Std with a general-purpose format can be stored in RAID 301 as it is while when reproducing the data, the AV data stream Std with a general-purpose format can be read out of RAID 301 as it is. It is thus possible to improve any performance for inputting/outputting a data stream (file) to/from the network 500 together with maintenance of real time in the synchronized record or reproduction of data. Further, it is possible to establish a real time record or reproduction operation in RAID 301 perfectly.

[Non-network Input Mode]

Figure 7:
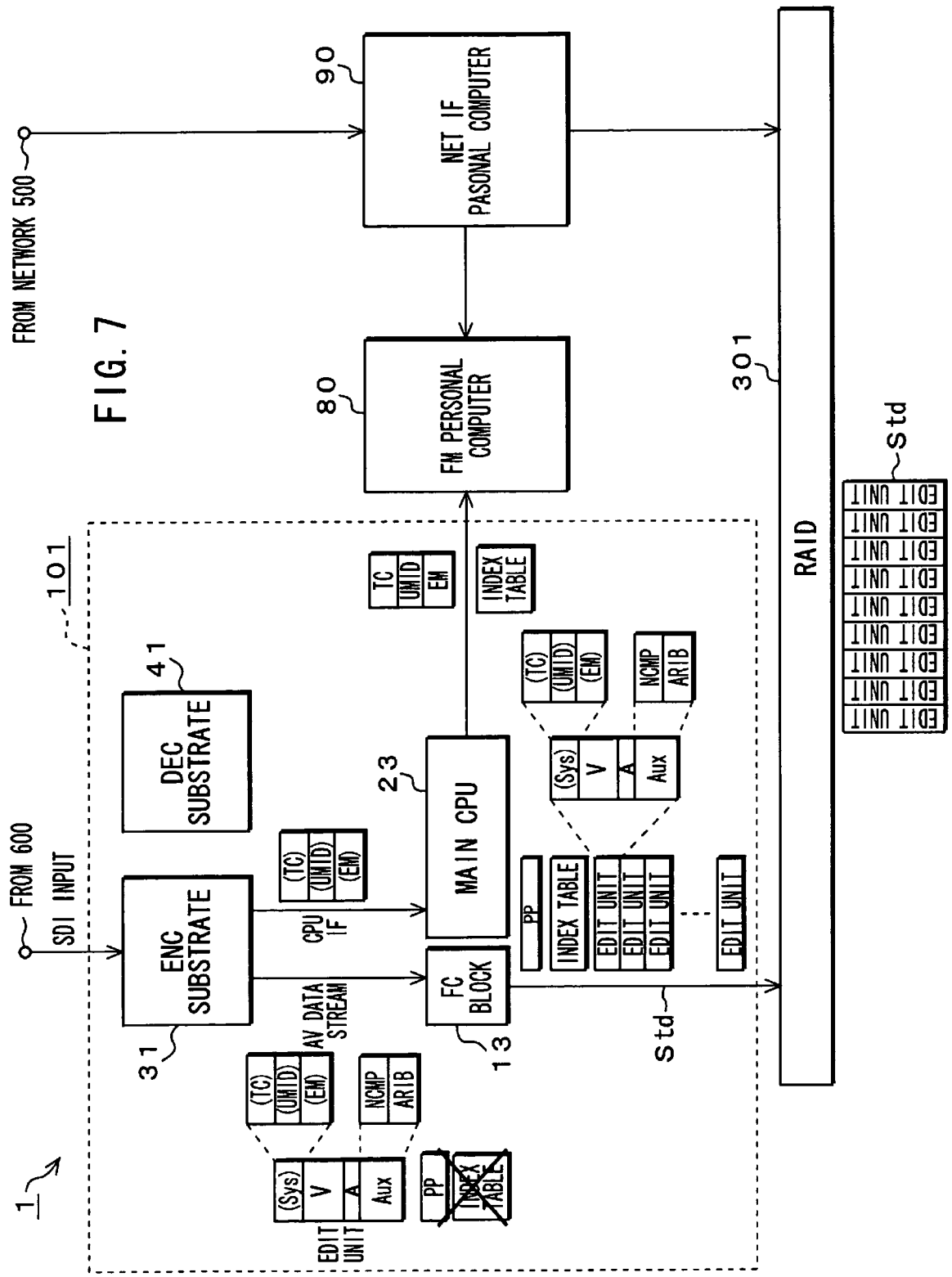
FIG. 7 is a schematic diagram for showing an operation example of a second embodiment of the AV server system in a non-network input mode.

FIG. 7 shows an operation example of a second embodiment of the AV server system 1 in a non-network input mode.

In this embodiment, it is assumed that the AV server system 1 performs the non-network input mode. The non-network input mode relates to a way to receive AV data (SDI input) with a non-general purpose format from a data-supplying system 600 other than the network such a broadcast station and a music distributor and encodes the data, store a stream data obtained by encoding the SDI data on RAID 301 of the AV server system 1, and hold and manage any header information which is added to the data stream thus obtained by encoding at a portion other than RAID 301.

The AV server system 1 shown in FIG. 7 is constituted of the FM personal computer 80, the Net IF personal computer 90, the data recording/reproducing device 101, and the RAID 301, which are shown in FIG. 2. The data recording/reproducing device 101 has the main CPU 23, the FC block 13, ENC substrate 31, and DEC substrate 41.

In the non-network input mode, the data recording/reproducing device 101 receives the AV data (SDI input) with a non-general purpose format from the data-supplying system 600 such as a broadcast station and a music distributor and encodes the SDI input. For example, the ENC substrate 31 packs System Item, UMID, Essence Mark, Time Code (TC), Picture Item, video data, Sound Item, audio data, Data Item, uncompressed line data, and ARIB auxiliary data in units of Edit Unit (frame) of MXF format after encoding the SDI input, and transmits the packed one to the bank memory 14 through the AV serial backplane 53. In this case, the ENC substrate 31 prevents the data such as Index Table, Partition Pack of the MXF format and the like from being transmitted to the bank memory 14. This enables only the Edit Unit to be stored in RAID 301.

The ENC substrate 31 informs the main CPU 23 of an amount of data (code-generating amount) in units of frame. When an amount of data corresponding to one bank of the bank memory 14 occupies the memory, the main CPU 23 allows for writing the data in the RAID 301 through the FC block 13. At the same time, the Main CPU 23 allows for writing the amount of data acquired from the ENC substrate 31 in units of frame, gathering it in units of data block, and informing the FM personal computer 80 thereof. As a result of operations, RAID 301 stores only the Edit Units relative to the SDI data that is received from the data-supplying system 600 such as a broadcast station and a music distributor.

In addition to the above, the ENC substrate 31 performs 2CH/4CH/8CH modes, and 16/24 bit modes relative to audio data at a setup for each port. For example, in the 4CH mode, only 4CH is packed while 5-8CHS have no corresponding Sound Item. The data which the Enc substrate 31 records is transmitted as it is based on the AV data stream Std on the RAID 301.

The FM personal computer 80 holds and manages the header information that is added to the AV data stream Std, which is encoded by the data recording/reproducing device 101. RAID 301 stores the AV data stream Std, which is encoded by the ENC substrate 31.

[Non-network Output Mode]

Figure 8:
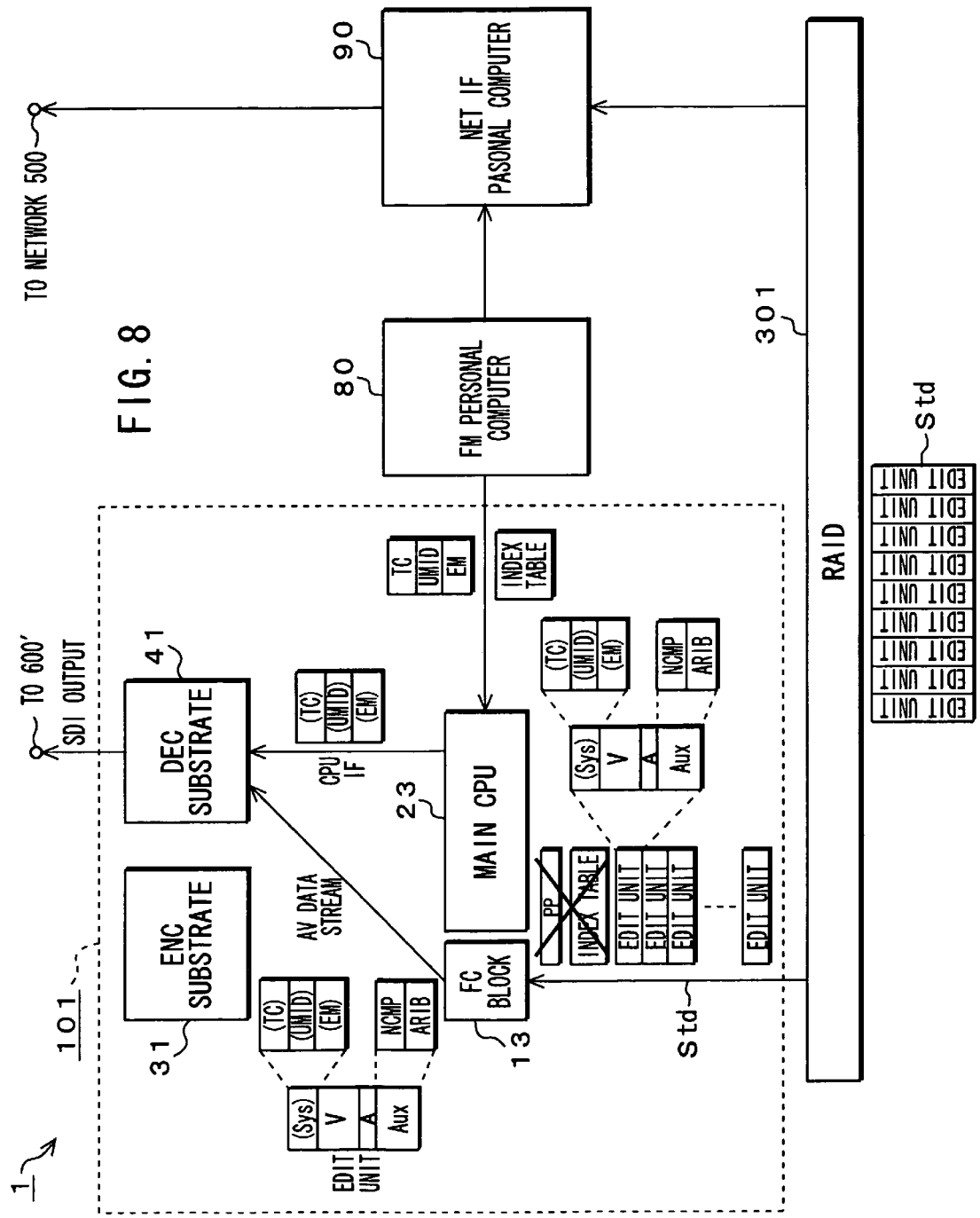
FIG. 8 is a schematic diagram for showing an operation example of the second embodiment of the AV server system in a non-network output mode.

FIG. 8 shows an operation example of the second embodiment of the AV server system 1 in a non-network output mode.

In this embodiment, it is assumed that in the AV server system 1, FM personal computer 80, Net IF personal computer 90 or control terminal 200 performs the non-network output mode when reproducing the data. The non-network output mode relates to a way to read the AV data stream Std, the header information of which is held and kept in the FM personal computer 80, out of RAID 301 of the AV server system 1, decodes the read AV data stream Std to produce SDI data, and output the SDI data to the data demand system 600' other than the network such as a broadcast station and a music distributor.

Referring to FIG. 8, in the non-network output mode, when reproducing the data, the FM personal computer 80 receives the header information from the control terminal 200 and controls the data recording/reproducing device 101 to reads the AV data stream Std corresponding to the received header information out of the RAID 301, decodes the AV data stream Std read out of RAID 301 to produce SDI data, and output the SDI data to the data demand system 600' such as a broadcast station and a music distributor.

For example, the main CPU 23 reads an amount of data in the AV data stream Std corresponding to one bank in the bank memory 14 out of RAID 301 through fiber channel switch 602. At the same time, the main CPU 23 acquires a frame index corresponding to this AV data stream Std of one bank from the FM personal computer 80. The main CPU 23 then transmits the AV data stream Std on the bank memory 14 to the DEC substrate 41 through the AV serial backplane 53 frame by frame (Edit Unit by Edit Unit) at a necessary timing of decoding (for every frame).

The DEC substrate 41 reads Edit Units transferred by the main CPU 23 and extracts MXF file therefrom based on a key and a length of data to branch so that video data can be transferred to MPEG decoder and audio data can be transferred to audio FPGA. These items of AV data are processed by any hardware to produce SDI data and the SDI data is transmitted to the data demand system 600 such as a broadcast station and a music distributor.

DEC substrate 41 changes its operation dynamically due to a number of channels (2/4/8 channels) and/or a number of bits (16/24 bits) in file for reproducing audio data. The number of channels is determined based on any information which software of the DEC substrate 41 extracts. The number of bits is determined based on any information of file entry. This is because the number of bits is described in Header Metadata (Generic Sound Essence Descriptor) and hard to see at an extracted time for each frame.

Thus, the FM personal computer 80 for managing files is applied to the AV server system 1 as the second embodiment. When recording the data, the data recording/reproducing device 101 receives the AV data (SDI data) with a non-general purpose format from the data-supplying system 600 such a broadcast station and a music distributor and encodes the SDI data. The Net IF personal computer 90 holds and manages the header information that is added to the AV data stream Std encoded by the data recording/reproducing device 101. RAID 301 stores the AV data stream Std encoded by the data recording/reproducing device 101.

When reproducing data, FM personal computer 80 receives the header information, and controls the data recording/reproducing device 101 to read the AV data stream Std corresponding to the received header information out of RAID 301, decode the AV data stream Std read out of RAID 301 to produce SDI data, and output the SDI data to the data demand system 600' such as a broadcast station and a music distributor. The data recording/reproducing device 101 decodes the AV data stream Std read out of RAID 301.

Thus, when recording the data, the AV data converted from the AV data stream with a non-general purpose format to the AV data stream with a general-purpose format can be stored in RAID 301 while when reproducing the data, the AV data stream Std with a general-purpose format can be read out of RAID 301. It is thus possible to improve any performance for inputting/outputting a SDI data with a non-general purpose format from the data-supplying system 600 such as a broadcast station and a music distributor together with maintenance of real time in the synchronized record or reproduction of data. Further, it is possible to establish a real time record or reproduction operation in RAID 301 perfectly.

[Network Input/Non-network Output Mode]

Figure 9:
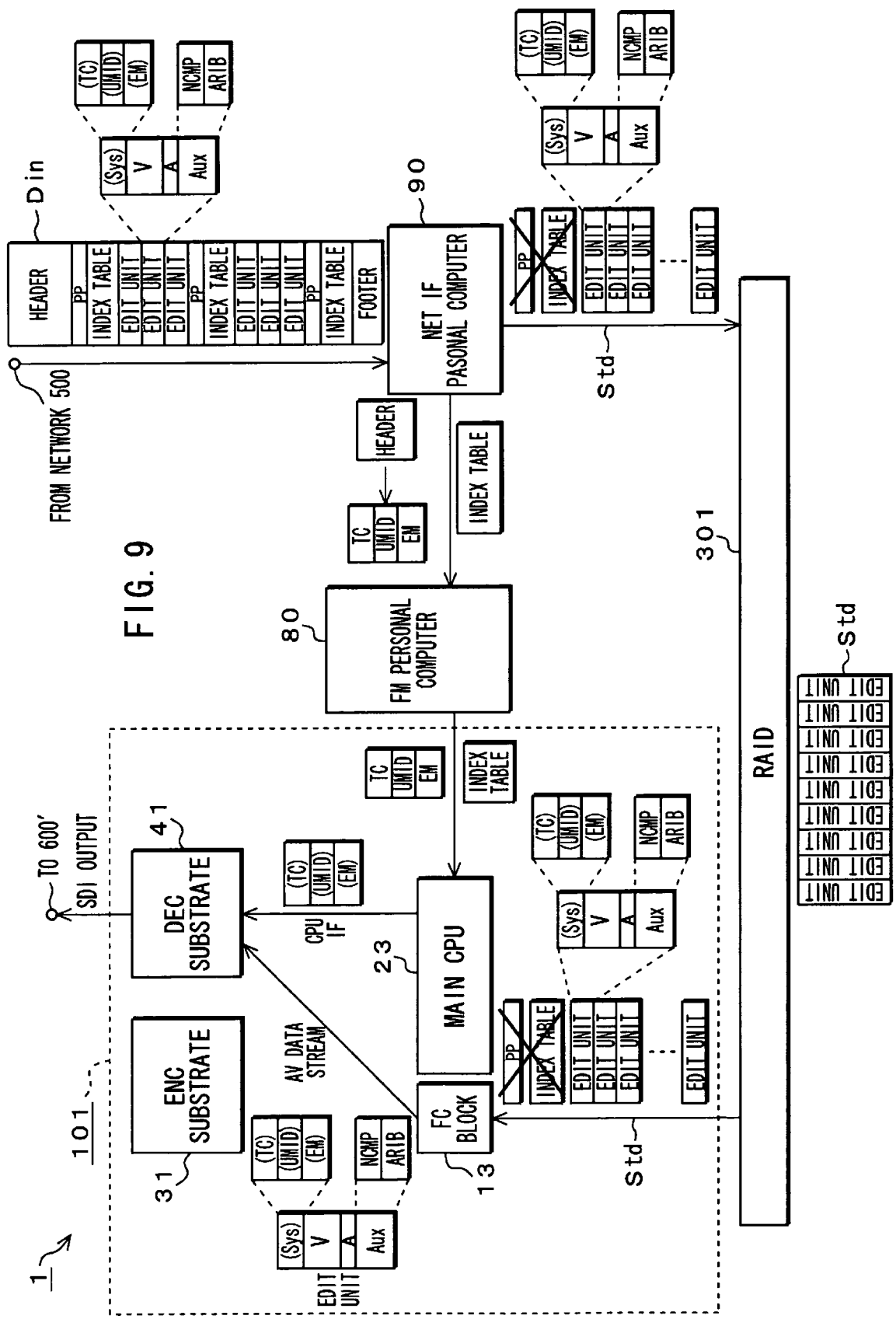
FIG. 9 is a schematic diagram for showing an operation example of a third embodiment of the AV server system in a network input/non-network output mode.

FIG. 9 shows an operation example of a third embodiment of the AV server system 1 in a network input/non-network output mode.

In this embodiment, it is assumed that the AV server system 1 performs the network input/non-network output mode. The network input/non-network output mode relates to away to receive a data stream Din with a predetermined data format from the network 500, store the AV data stream Std obtained by separating any header information therefrom in RAID 301 of the AV server system 1, read the AV data stream Std out of RAID 301 to decode it to produce SDI data, and output the SDI data to the data demand system 600' other than the network such as a broadcast station and a music distributor.

The AV server system 1 shown in FIG. 9 is constituted of the FM personal computer 80, the Net IF personal computer 90, the data recording/reproducing device 101, and the RAID 301, which are shown in FIG. 2. The data recording/reproducing device 101 has the main CPU 23, the FC block 13, the ENC substrate 31, and the DEC substrate 41.

In the network input/non-network output mode, when recording the data, the Net IF personal computer 90 receives the data stream Din with a general-format, which is constituted of data and additional information, from the network, separates the additional information (header information) from the data stream Din, and controls FM personal computer 80 to hold and manage the additional information (header information). The header information includes the MXF header in which Run In, Header Partition Pack, and Header Metadata are arranged in turn from a top thereof to an end thereof, as shown in FIG. 4.

When receiving MXF file, the Net IF personal computer 90 receives the XF file, extracts a header portion therefrom and informs the FM personal computer 80 of any data that is necessary for managing files in the FM personal computer 80. For example, the Net IF personal computer 90 acquires frame information such as numbers of channels or bits from Generic Sound Essence Descriptor in the Header Metadata or Delta Entry Array in the Index Table and transmits the frame information to the FM personal computer 80. The FM personal computer 80 writes the frame information such as numbers of channels or bits in its file entry. Thus, the FM personal computer 80 files and stores the frame information.

The Net IF personal computer 90 next extracts the partition pack (PP) and Index Table therefrom with referring to the data of the file body. The Net IF personal computer 90 then writes only the Edit Units remained in the file body in RAID 301 through the fiber channel switch 602 when a set amount of data occupies the memory. At the same time, the Net IF personal computer 90 generates any frame index information of written block unit from the extracted MXF Index Table and informs the FM personal computer 80 thereof.

The Net IF personal computer 90 transmits an AV data stream Std (together with numbers of channels or bits) obtained by separating the header information from the stream data Din to RAID 301 as it is without taking part in any contents of the Edit Unit. This is because the Net IF personal computer 90 is set to store received data as it is without taking part in any data in the received Edit Unit, as a rule. Thus, RAID 301 stores the AV data stream Std (a group of Edit Units) obtained by separating the header information from the data stream Din with the Net IF personal computer 90. As a result of operations, RAID 301 stores only Edit Units.

In the network input/non-network output mode, when reproducing the data, the FM personal computer 80 receives the header information from the control terminal 200 and controls the data recording/reproducing device 101 to reads the AV data stream Std corresponding to the received header information out of the RAID 301, decodes the AV data stream Std read out of RAID 301 to produce SDI data, and output the SDI data to the data demand system 600' such as a broadcast station and a music distributor.

For example, the main CPU 23 reads an amount of data in the AV data stream Std corresponding to one bank in the bank memory 14 out of RAID 301 through fiber channel switch 602. At the same time, the main CPU 23 acquires a frame index corresponding to this AV data stream Std of one bank from the FM personal computer 80. The main CPU 23 then transmits the AV data stream Std on the bank memory 14 to the DEC substrate 41 through the AV serial backplane 53 frame by frame (Edit Unit by Edit Unit) at a necessary timing of decoding (for every frame).

The DEC substrate 41 reads Edit Units transferred by the main CPU 23 and extracts MXF file therefrom based on a key and a length of data to branch so that video data can be transferred to MPEG decoder and audio data can be transferred to audio FPGA. These items of AV data are processed by any hardware to produce SDI data and the SDI data is transmitted to the data demand system 600' such as a broadcast station and a music distributor.

Thus, on the operation example of the third embodiment of the AV server system 1 in the network input/non-network output mode, the network input mode shown in FIG. 5 and the non-network output mode shown in FIG. 8 can be combined.

Thus, when recording the data, the AV data stream Std with a general-purpose format can be stored in RAID 301 as it is while when reproducing the data, the AV data stream Std with a general-purpose format read out of RAID 301 can be decoded. It is thus possible to improve any performance for inputting/outputting the AV data stream Std with a general purpose format from the network 500 and to the data-demand system 600, such as a broadcast station and a music distributor together with maintenance of real time in the synchronized record or reproduction of data. Further, it is possible to establish a real time record or reproduction operation in RAID 301 perfectly.

[Non-network Input/Network Output Mode]

Figure 10:
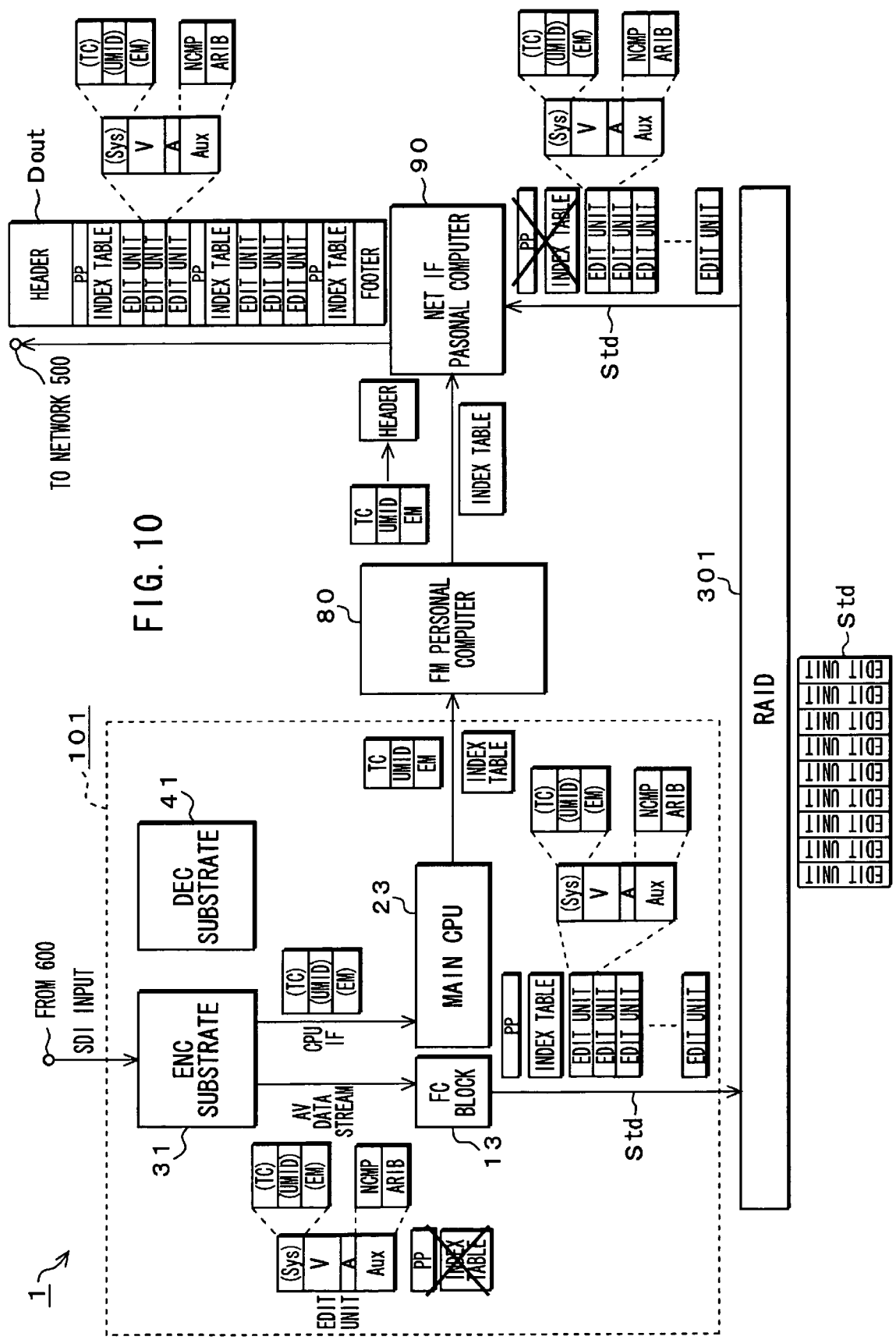
FIG. 10 is a schematic diagram for showing an operation example of a fourth embodiment of the AV server system in a non-network input/network output mode.

FIG. 10 shows an operation example of a fourth embodiment of the AV server system 1 in a non-network input/network output mode.

In this embodiment, it is assumed that the AV server system 1 performs the non-network input/network output mode. The non-network input/network output mode relates to a way to receive an SDI data with a non-general purpose format from the data-supplying system 600 other than the network such as a broadcast station and a music distributor to encode the SDI data, store the AV data stream Std obtained by encoding the SDI data in RAID 301 of the AV server system 1, hold and manage any header information that is added to the AV data stream Std obtained by encoding the SDI data in a position other than RAID 301, read the AV data stream Std from which the header information is separated out of RAID 301 of the AV server system 1, add the header information to the read AV data stream Std to produce AV data stream Dout with a predetermined format, and output the AV data stream Dout to the network 500.

The AV server system 1 shown in FIG. 10 is constituted of the FM personal computer 80, the Net IF personal computer 90, the data recording/reproducing device 101, and the RAID 301, which are shown in FIG. 2. The data recording/reproducing device 101 has the main CPU 23, the FC block 13, the ENC substrate 31, and the DEC substrate 41.

In the non-network input/network output mode, when recording the data, the data recording/reproducing device 101 receives the AV data (SDI input) with a non-general purpose format from the data-supplying system 600 such as a broadcast station and a music distributor and encodes the SDI data. For example, the ENC substrate 31 packs System Item, UMID, Essence Mark, Time Code (TC), Picture Item, video data, Sound Item, audio data, Data Item, uncompressed line data, and ARIB auxiliary data in units of Edit Unit (frame) of MXF format after encoding the SDI input, and transmits the packed one to the bank memory 14 through the AV serial backplane 53. In this case, the ENC substrate 31 prevents the data such as Index Table, Partition Pack of the MXF format and the like from being transmitted to the bank memory 14. This allows only the Edit Unit to be stored in RAID 301.

The ENC substrate 31 informs the main CPU 23 of an amount of data (code-generating amount) in units of frame. When an amount of data corresponding to one bank of the bank memory 14 occupies the memory, the main CPU 23 allows for writing the data in the RAID 301 through the FC block 13. At the same time, the Main CPU 23 allows for writing the amount of data acquired from the ENC substrate 31 in units of frame, gathering it in units of data block, and informing the FM personal computer 80 thereof. As a result of operations, RAID 301 stores only the Edit Units relative to the SDI data that is received from the data-supplying system 600 such as a broadcast station and a music distributor.

In addition to the above, the ENC substrate 31 performs 2CH/4CH/8CH modes, and 16/24 bit modes relative to audio data at a setup for each port. For example, in the 4CH mode, only 4CH is packed while 5-8CHS have no corresponding Sound Item. The data which the Enc substrate 31 records is transmitted as it is based on the AV data stream Std on the RAID 301.

The FM personal computer 80 holds and manages the header information that is added to the AV data stream Std, which is encoded by the data recording/reproducing device 101. RAID 301 stores the AV data stream Std, which is encoded by the ENC substrate 31.

In the non-network input/network output mode, when reproducing the data, the Net IF personal computer 90 receives the header information, reads the AV data stream Std corresponding to the received header information out of the RAID 301, combines the header information and the AV data stream Std to produce a data stream Dout with a general-format. In this case, the Net IF personal computer 90 adds a Header portion, an Index Table, a Partition Pack (PP) thereto based on any additional information from the FM personal computer 80 when transmitting the data stream to the network 500.

For example, the Net IF personal computer 90 opens the file for a file transfer protocol (FTP) and acquires from the FM personal computer 80 any information that is necessary for producing an MXF header of this file to produce the MXF header. The Net IF personal computer 90 reads a set amount of data in the AV data stream Std out of RAID 301 through the fiber channel switch 602. At the same time, the Net IF personal computer 90 acquires a frame index corresponding to this AV data stream Std from the FM personal computer 80. The Net IF personal computer 90 produces the Index Table from the acquired AV data stream Std.

The Net IF personal computer 90 then transmits the AV data stream Std with the Partition Pack (PP) and the Index Table being suitably inserted between items of data in Edit Units read out of RAID 301 after transmitting the MXF header. The Net IF personal computer 90 finally transmits an MXF footer and finishes the transmission processing.

In the non-network input/network output mode, the Net IF personal computer 90 transmits the stored AV data stream Std as it is without taking part in contents of the AV data stream Std in the Edit Unit on RAID 301, as a rule. The AV data stream Std is manipulated only by the Header portion, the Partition Pack, the Index Table, the Footer, and the like. This allows the AV data stream with a general-purpose format to be transmitted to a network connector through the network 500.

Thus, on the operation example of the fourth embodiment of the AV server system 1 in the non-network input/network output mode, the non-network input mode shown in FIG. 7 and the network output mode shown in FIG. 6 can be combined.

Thus, when recording the data, the AV data converted from the SDI data with a non-general purpose format to the AV data stream with a general-purpose format can be stored in RAID 301 while when reproducing the data, the AV data stream Std with a general-purpose format can be read out of RAID 301 as it is. It is thus possible to improve any performance for inputting/outputting the SDI data from the data-supplying system 600 such as a broadcast station and a music distributor and the AV data stream Dout to the network 500 together with maintenance of real time in the synchronized record or reproduction of data. Further, it is possible to establish a real time record or reproduction operation in RAID 301 perfectly.

Figure 11:
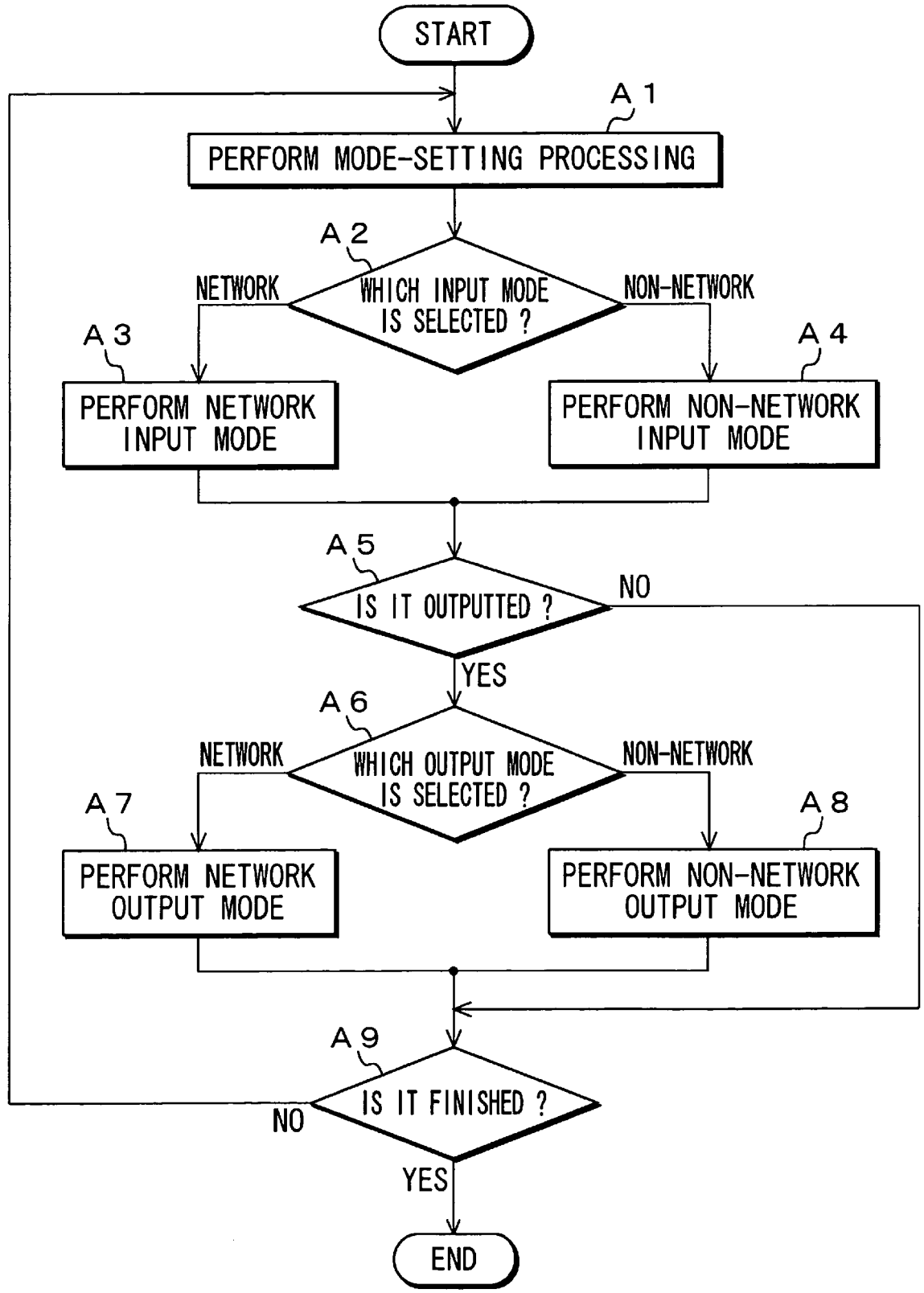
FIG. 11 is a flowchart for showing a selection example of each mode relative to a fifth embodiment.

FIG. 11 is a flowchart for showing a selection example of each mode relative to a fifth embodiment. In this embodiment, as described in the above first to fourth embodiments, the AV server system 1 is equipped with the network input mode, the non-network input mode, the network output mode, and the non-network output mode. An operator can manipulate the control terminal 200 to set the modes. In this embodiment, an access from the network 500 has a priority so that data with any file format such as MXF and AVI can be stored in RAID 301 as it is as much as it can.

In assumption of these, at step A1 of the flowchart shown in FIG. 11, the mode is set. If the network input mode is set, the control terminal 200, for example, outputs a first mode control signal to the main CPU 23 in each of the data recording/reproducing devices 101-104 and the like. If the non-network input mode is set, the control terminal 200 outputs a second mode control signal thereto. If the network output mode is set, the control terminal 200 outputs a third mode control signal thereto. If the non-network output mode is set, the control terminal 200 outputs a fourth mode control signal thereto.

Next, at step A2, for example, the main CPU 23 of, for example, the data recording/reproducing device 101 branches its control based on the mode set by the control terminal 200. If receiving the first mode control signal, the process goes to step A3 where the main CPU 23 performs the network input mode. In this case, the Net IF personal computer 90 receives a message that the network input mode is set from the main CPU 23. The Net IF personal computer 90 then receives a data stream Din with a general format, which is constituted of the AV data stream Std and the header information, from the network 500 as shown in FIG. 5, separating the header information from the data stream Din, storing the AV data stream Std obtained by separating the header information from the data stream Din in RAID 301 (a first memory area thereof), and storing the header information that is separated from the data stream Din in a memory (a second memory area) of FM personal computer 80.

If receiving the second mode control signal, the process goes to step A4 where the main CPU 23 performs the non-network input mode. In this case, the main CPU 23 allows for receiving a SDI data with a non-general purpose format from the data-supplying system 600 such as a broadcast station and a music distributor and encoding the SDI data thus received, producing the header information that is added to the AV data stream Std obtained by encoding, storing the header information in the FM personal computer 80, and storing the AV data stream Std obtained by encoding in RAID 301.

Further, at step A5, the main CPU 23 allows for waiting a receipt of a notice on whether the AV data stream Std stored in RAID 301 is reproduced. For example, the control terminal 200 transmits any reproduction instruction to the main CPU23 in each of the data recording/reproducing devices 101-104. If any of the data recording/reproducing devices 101-104 receive the reproduction instruction, the process goes to step A6. If no data recording/reproducing devices 101-104 receive the reproduction instruction, the process goes to step A9.

If the control terminal 200 transmits any reproduction instruction, at the step A6, the main CPU 23 of, for example, the data recording/reproducing device 101 branches its control based on the mode set by the control terminal 200. If receiving the third mode control signal, the process goes to step A7 where the main CPU 23 performs the network output mode. In this case, the Net IF personal computer 90 receives a message that the network output mode is set from the main CPU 23. The FM personal computer 80 receives the header information and the Net IF personal computer 90 then reads the header information out of the FM personal computer 80, reads the AV data stream Std corresponding to the header information out of RAID 301, combines the header information and the AV data stream Std to produce a data stream with a general-purpose, and outputting the data stream to a network connector (data demand system).

If receiving the fourth mode control signal, the process goes to step A8 where the main CPU 23 performs the non-network output mode. In this case, the FM personal computer 80 receives the header information and the main CPU 23 allows for receiving the header information from the FM personal computer 80, reading the AV data stream Std corresponding to the header information out of RAID 301, decoding the AV data stream Std read out of RAID 301, and outputting the AV data obtained by decoding the AV data stream Std to the data demand system 600' such as a broadcast station and a music distributor.

The process then goes to step A9 where it is determined whether the data recording/reproducing process is finished. The operator manipulating the control terminal 200 determines its finish. If repeating the data recording/reproducing process, the process goes back to the step A1. If the data recording/reproducing process is finished, the control terminal 200 transmits any notification such that the data recording/reproducing process is finished to the main CPU 23 of each of the data recording/reproducing devices 101-104.

Thus, according to the information management method as the fifth embodiment, if the data stream Din with a general format, which is constituted of the AV data stream Std and the header information, is managed and the AV data stream Std is stored, the AV data stream Std can be stored in RAID 301 (the second memory area) as it is with the AV data stream Std having a general format. It is thus possible to improve any performance for inputting/outputting the stream data (file) from the network 500 together with maintenance of real time in the synchronized record or reproduction of data in the AV server system 1 that is necessary for real time maintenance in record/reproduction of synchronized data and input/output from the network. Further, it is possible to establish a real time record or reproduction operation in RAID 301 perfectly.

If the information recording/reproducing system where the SDI (AV) data with non-general purpose format is received from the data-supplying system 600 such as a broadcast station and a music distributor and the SDI data is encoded is managed and the AV data stream Std is stored, the AV data after converting the SDI (AV) data with non-general purpose format to the AV data stream Std can be stored in RAID 301. It is thus possible to improve any performance for inputting/outputting the SDI (AV) data with non-general purpose format from the data-supplying system 600 together with maintenance of real time in the synchronized record or reproduction of data. Further, it is possible to establish a real time record or reproduction operation in RAID 301 perfectly.

The embodiments of the invention are preferably applied to an file management in an AV server system that stores and/or reproduce the AV data stream in and/or from the data recording device.

It should be understood by those skilled in the art that various modifications, combinations, sub-combinations and alternations may occur depending on design requirements and other factors insofar as they are within the scope of the appended claims or the equivalents thereof.

What is claimed is:

1. An information management system comprising:
an information management apparatus that receives a data stream constituted of data and additional information from a data-supplying system, said data stream having a general-purpose format, and separates the additional information from the data stream to hold and manage the data obtained by separating the additional information from the data stream; and
a data storage device that stores the data obtained by separating the additional information from the data stream with the information management apparatus,
wherein the data stream and additional information are separately received by the data storage device and the information management apparatus, respectively, and
wherein, when reproducing the data, the information management apparatus:
receives the additional information;
reads data corresponding to the received additional information out of the data storage device;
combines the additional information and the data to produce the data stream with the general-purpose format; and
transmits the data stream to a data demand system.

2. The information management system of claim 1, further comprising an information recording/reproducing apparatus that decodes the data read out of the data storage device,
wherein, when reproducing the data, the information management apparatus controls the information recording/reproducing apparatus to:
receive the additional information;
read data corresponding to the received additional information out of the data storage device; and
decode the data read out of the data storage device to transmit the decoded data to a data demand system.

3. An information management system comprising:
information management means for receiving a data stream constituted of data and additional information from a data-supplying system, said data stream having a general-purpose format, and separating the additional information from the data stream to hold and manage the data obtained by separating the additional information from the data stream; and
data storage means for storing the data obtained by separating the additional information from the data stream with the information management means,
wherein the data stream and additional information are separately received by the data storage device and the information management apparatus, respectively, and
wherein, when reproducing the data, the information management system:
receives the additional information;

reads data corresponding to the received additional information out of the data storage means;

combines the additional information and the data to produce the data stream with the general-purpose format; and transmits the data stream to a data demand system.

4. An information management system comprising:

an information recording/reproducing apparatus that receives data with a non-general purpose format from a data-supplying system and encodes the data;

an information management apparatus that holds and manages additional information which is added to the data encoded by the information recording/reproducing apparatus; and a data storage device that stores the data encoded by the information recording/reproducing apparatus, wherein the data stream and additional information are separately received by the data storage device and the information management apparatus, respectively, and wherein, when reproducing the data, the information management system:

receives the additional information;

reads data corresponding to the received additional information out of the data storage device;

combines the additional information and the data to produce the data stream with the general-purpose format; and transmits the data stream to a data demand system.

5. The information management system of claim 4, wherein, when reproducing the data, the information management apparatus controls the information recording/reproducing apparatus to:

receive the additional information;

read data corresponding to the received additional information out of the data storage device; and decode the data read out of the data storage device to transmit the decoded data to a data demand system.

6. The information management system of claim 4, wherein, when reproducing the data, the information management apparatus:

receives the additional information;

reads data corresponding to the received additional information out of the data storage device;

combines the data read out of the data storage device and the additional information to produce a data stream with a general-purpose format; and transmits the data stream to a data demand system.

7. An information management apparatus that manages a data stream with a general-purpose format, said data stream being constituted of data and additional information, Wherein, when recording the data, the information management apparatus receives the data stream from a data-supplying system, separates the additional information from the data stream, and stores the data obtained by separating the additional information from the data stream on a data storage device, wherein the data stream and additional information are separately received by the data storage device and the information management apparatus, respectively, and wherein, when reproducing the data, the information management apparatus:

receives the additional information;

reads data corresponding to the received additional information out of the data storage device;

combines the additional information and the data to produce the data stream with the general-purpose format; and transmits the data stream to a data demand system.

8. The information management apparatus of claim 7, wherein, when reproducing the data, the information management apparatus:

receives the additional information;

reads data corresponding to the received additional information out of the data storage device;

combines the additional information and the data to produce a data stream with a general-purpose format; and transmits the data stream to a data demand system.

9. The information management apparatus of claim 7, wherein, when reproducing the data, the information management apparatus manages an information management system to:

receive the additional information;

read the data corresponding to the received additional information out of the data storage device;

decode the data read out of the data storage device; and transmit the decoded data to a data demand system.

10. An information management apparatus that manages a data stream with a general-purpose format, said data stream being constituted of data and additional information, Wherein, when recording the data, the information management apparatus receives the data stream from a data-supplying system, separates the additional information from the data stream, and stores the data obtained by separating the additional information from the data stream on data storage means, wherein the data stream and additional information are separately received by the data storage device and the information management apparatus, respectively, and wherein, when reproducing the data, the information management apparatus:

receives the additional information;

reads data corresponding to the received additional information out of the data storage means;

combines the additional information and the data to produce the data stream with the general-purpose format; and transmits the data stream to a data demand system.

11. An information management apparatus that is connected with an information recording/reproducing system, which receives data with a non-general purpose format from a data-supplying system and encodes the data, Wherein, when recording the data, the information management apparatus holds and manages additional information that is added to the data encoded by the information recording/reproducing system, and stores the encoded data on data storage device, wherein the data stream and additional information are separately received by the data storage device and the information management apparatus, respectively, and wherein, when reproducing the data, the information management apparatus:

receives the additional information;

reads data corresponding to the received additional information out of the data storage device;

combines the additional information and the data to produce the data stream with the general-purpose format; and transmits the data stream to a data demand system.

12. The information management apparatus of claim 11, wherein, when reproducing the data, the information management apparatus controls the information recording/reproducing system to:

receive the additional information;

read data corresponding to the received additional information out of the data storage device; and decode the data read out of the data storage device to transmit the decoded data to a data demand system.

13. The information management apparatus of claim 11, wherein, when reproducing the data, the information management apparatus:

receives the additional information;

reads data corresponding to the received additional information out of the data storage device;

combines the data read out of the data storage device and the additional information to produce a data stream with a general-purpose format; and transmits the data stream to a data demand system.

14. An information management method comprising, when recording data, the steps of:

receiving the data stream with a general-purpose format from a data-supplying system, said data stream being constituted of the data and additional information;

separating the additional information from the data stream received from the data-supplying system;

storing the data obtained by separating the additional information from the data stream on a first memory area, and storing the additional information that is separated from the data stream on a second memory area, wherein the data stream and additional information are separately stored on the first memory area and the second memory area, respectively, wherein the data stream and additional information are separately received by the data storage device and the information management apparatus, respectively, and wherein, when reproducing the data, the information management method performs the steps comprising:

receiving the additional information;

reading the received additional information out of the second memory area;

reading the data corresponding to the received additional information out of the first memory area;

combining the additional information and the data to produce the data stream with the general-purpose format; and transmitting the data stream to a data demand system.

15. The information management method of claim 14, further comprising, when reproducing the data, the steps of:

receiving the additional information;

reading the received additional information out of the second memory area;

reading the data corresponding to the received additional information out of the first memory area;

decoding the data read out of the first memory area; and transmitting the decoded data to a data demand system.

16. An information management method comprising, when recording data, the steps of:

receiving data with a non-general purpose format from a data-supplying system;

encoding the data received from the data-supplying system and producing additional information that is added to the encoded data;

storing the additional information in a second memory area; and storing the encoded data in a first memory area, wherein the data stream and additional information are separately stored on the first memory area and the second memory area, respectively receiving the additional information, wherein, when reproducing the data, the information management method performs the steps comprising:

receiving the additional information;

reading the received additional information out of the second memory area;

reading the data corresponding to the received additional information out of the first memory area;

combining the additional information and the data to produce the data stream with the general-purpose format; and transmitting the data stream to a data demand system.

17. The information management method of claim 16 further comprising, when reproducing the data, the steps of:

receiving the additional information;

reading the received additional information out of the second memory area;

reading the data corresponding to the additional information out of the first memory area;

decoding the data read out of the first memory are; and transmitting the decoded data to a data demand system.

18. The information management method of claim 16, further comprising, when reproducing the data, the steps of:

receiving the additional information;

reading the received additional information out of the second memory area;

reading the data corresponding to the additional information out of the first memory area;

combining the data and the additional information to produce a data stream with a general-purpose format; and transmitting the data stream to a data demand system.

* * * * *